United States Patent
Anderson

(10) Patent No.: US 12,120,217 B2
(45) Date of Patent: *Oct. 15, 2024

(54) STRONG FULLY HOMOMORPHIC WHITE-BOX AND METHOD FOR USING SAME

(71) Applicant: ARRIS Enterprises LLC, Suwanee, GA (US)

(72) Inventor: Lex Aaron Anderson, Auckland (NZ)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,193

(22) Filed: Jun. 22, 2023

(65) Prior Publication Data

US 2023/0353344 A1 Nov. 2, 2023

Related U.S. Application Data

(63) Continuation of application No. 17/235,794, filed on Apr. 20, 2021, now Pat. No. 11,728,965, which is a (Continued)

(51) Int. Cl.
*H04L 9/00* (2022.01)
*G06F 21/00* (2013.01)
(Continued)

(52) U.S. Cl.
CPC .............. *H04L 9/008* (2013.01); *G06F 21/60* (2013.01); *G06F 21/602* (2013.01);
(Continued)

(58) Field of Classification Search
CPC ...... G06F 21/60; G06F 21/602; G06F 21/604; H04L 9/006; H04L 9/008; H04L 9/30;
(Continued)

(56) References Cited

U.S. PATENT DOCUMENTS

2009/0252327 A1* 10/2009 Ciet ........................ H04L 9/002
380/277
2018/0198613 A1 7/2018 Anderson

FOREIGN PATENT DOCUMENTS

EP 3493456 A1 6/2019

OTHER PUBLICATIONS

International Search Report and Written Opinion Re: Application No. PCT/US2021/016598 (dated May 14, 2021).
(Continued)

*Primary Examiner* — Edward Zee
(74) *Attorney, Agent, or Firm* — Chernoff, Vilhauer, McClung & Stenzel, LLP

(57) ABSTRACT

A fully homomorphic white-box implementation of one or more cryptographic operations is presented. This method allows construction of white-box implementations from general-purpose code without necessitating specialized knowledge in cryptography, and with minimal impact to the processing and memory requirements for non-white-box implementations. This method and the techniques that use it are ideally suited for securing "math heavy" implementations, such as codecs, that currently do not benefit from white-box security because of memory or processing concerns. Further, the fully homomorphic white-box construction can produce a white-box implementation from general purpose program code, such as C or C++.

8 Claims, 8 Drawing Sheets

Related U.S. Application Data continuation of application No. 16/787,474, filed on Feb. 11, 2020, now Pat. No. 10,985,905, which is a continuation-in-part of application No. 15/865,689, filed on Jan. 9, 2018, now Pat. No. 10,749,675.

(60) Provisional application No. 62/443,926, filed on Jan. 9, 2017.

(51) Int. Cl.
    *G06F 21/60* (2013.01)
    *H04L 9/06* (2006.01)
    *H04L 9/08* (2006.01)
    *H04L 9/30* (2006.01)

(52) U.S. Cl.
    CPC .......... *G06F 21/606* (2013.01); *H04L 9/0631* (2013.01); *H04L 9/0861* (2013.01); *H04L 9/302* (2013.01); *H04L 2209/16* (2013.01)

(58) Field of Classification Search
    CPC ... H04L 9/3006; H04L 9/3026; H04L 9/3033; H04L 9/3066
    See application file for complete search history.

(56) References Cited

OTHER PUBLICATIONS

Yixian Cai et al: "Secure and trusted white-box verification", arxiv.org, Cornell University Library, 201 Olin Library Cornell University Ithaca, NY 14853, May 12, 2016 (May 12, 2016), XP080704675, abstract Chapter 1. "Introduction" Chapter 2. "Preliminaries".

* cited by examiner

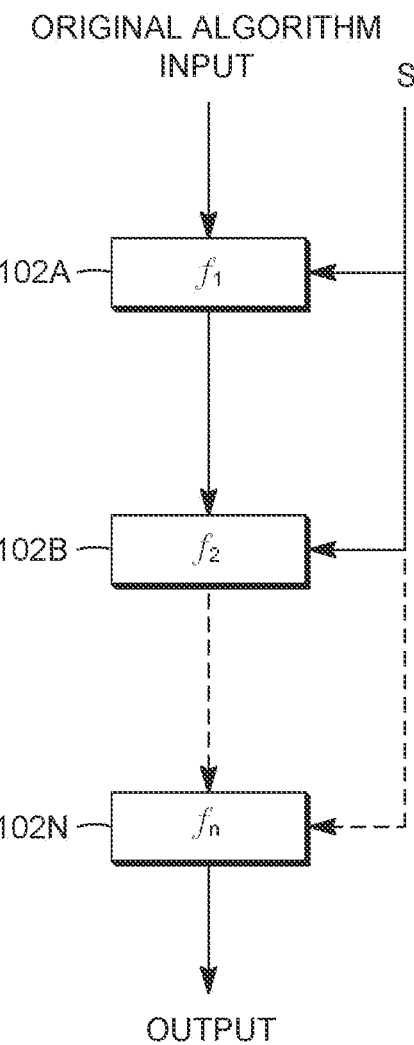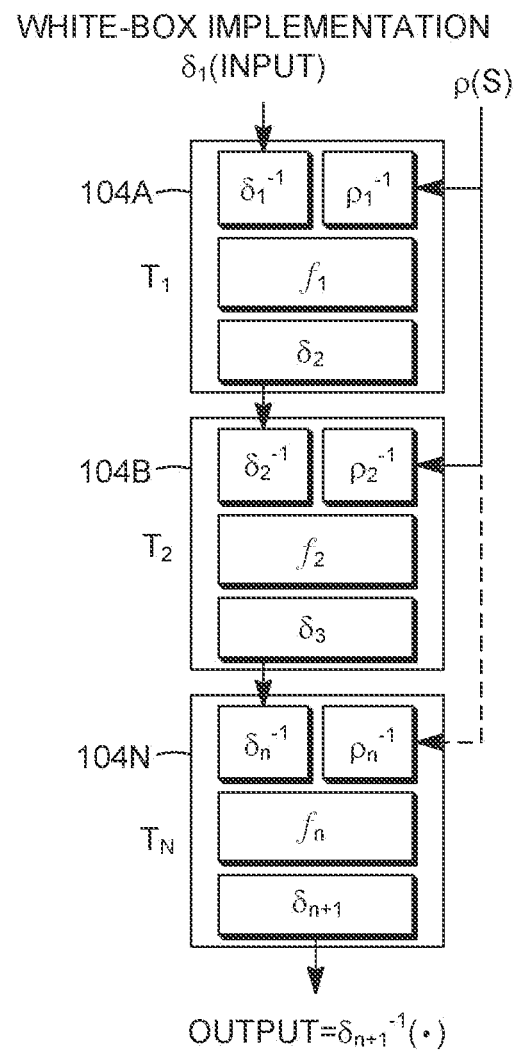
FIG. 1A
FIG. 1B

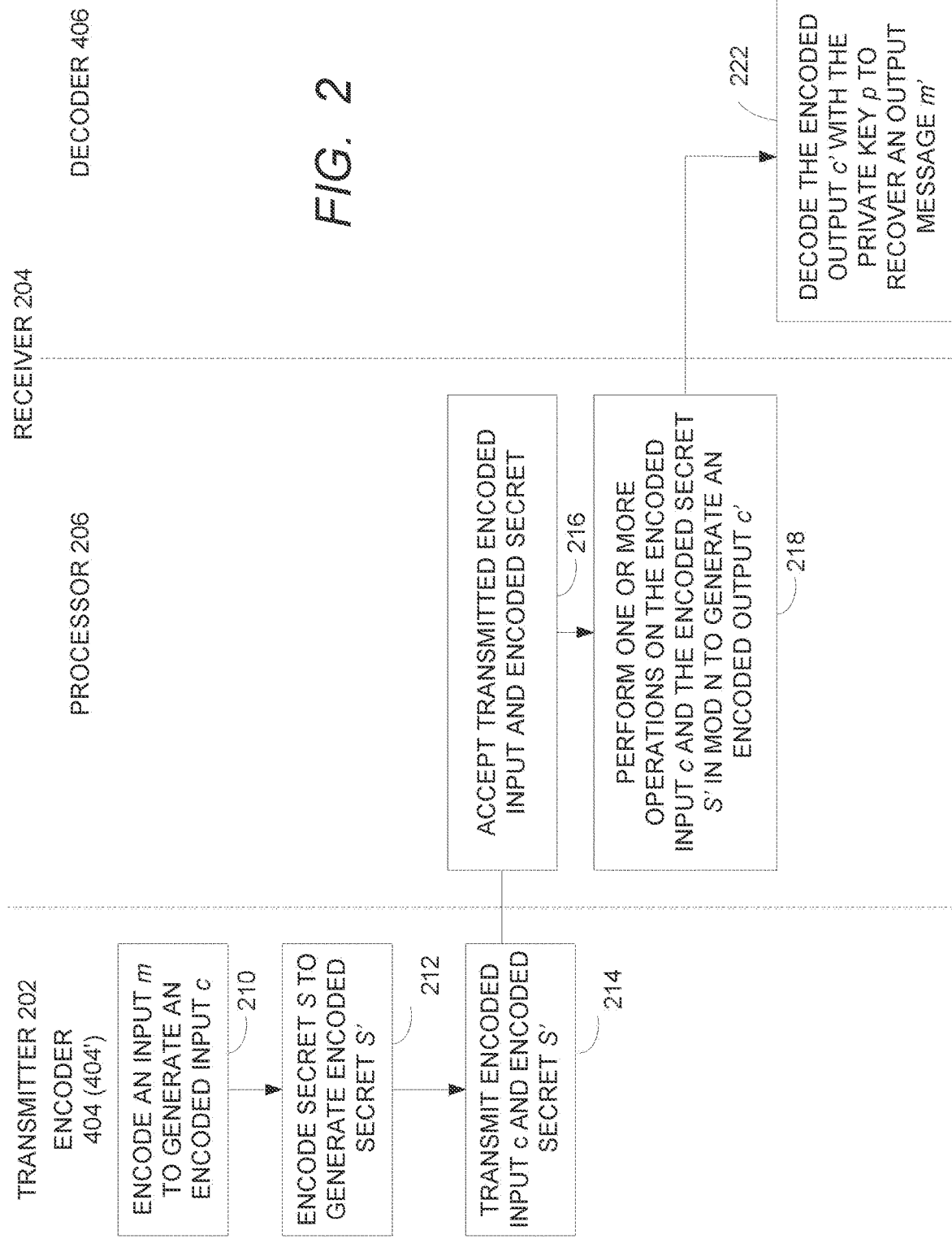

| b | Baseline Performance | w | FHWI Performance | Delta |
|---|---|---|---|---|
| 64 | 212 μsec/iteration | 128 | 604 μsec/iteration | 3.2 |
| 64 | 212 μsec/iteration | 128 | 2.0 ms/iteration | 9.2 |
| 64 | 212 μsec/iteration | 128 | 7.8 ms/iteration | 36.9 |
| 64 | 212 μsec/iteration | 128 | 31.0 ms/iteration | 144.5 |

*FIG. 5*

| b | Baseline Performance | w | FHWI Performance | Delta |
|---|---|---|---|---|
| 8 | 264 KB | 128 | 2.3 KB | 0.009 |
| 8 | 264 KB | 256 | 2.5 KB | 0.009 |
| 8 | 264 KB | 512 | 3.1 KB | 0.012 |
| 8 | 264 KB | 1024 | 4.1 KB | 0.016 |

*FIG. 6*

STRONG FULLY HOMOMORPHIC WHITE-BOX AND METHOD FOR USING SAME

CROSS-REFERENCE TO RELATED APPLICATIONS

This application is a continuation of U.S. patent application Ser. No. 17/235,794 filed Apr. 20, 2021, which is a continuation of U.S. patent application Ser. No. 16/787,474 filed Feb. 11, 2011, now U.S. Pat. No. 10,985,905, which is a continuation-in-part of U.S. patent application Ser. No. 15/865,689, entitled "HOMOMORPHIC WHITE BOX SYSTEM AND METHOD FOR USING SAME," filed Jan. 9, 2018, now U.S. Pat. No. 10,749,675, which application claims benefit of U.S. Provisional Patent Application No. 62/443,926 entitled "CANDIDATE FULLY HOMOMORPHIC WHITE BOX SYSTEM," by Lex Aaron Anderson, Alexander Medvinsky, and Rafie Shamsaasef, filed Jan. 9, 2017, both of which applications are hereby incorporated by reference herein.

BACKGROUND

1. Field of the Invention

The present invention relates to systems and methods for performing cryptographic operations, and in particular to a system and method for securely performing homomorphic cryptographic operations.

2. Description of the Related Art

The goal of much of cryptography is to allow dissemination of information in such a way that prevents disclosure to unauthorized entities. This goal has been met using cryptographic systems (such as the Advanced Encryption Standard (AES), Triple Data Encryption Standard (IDES), Rivest-Shamir-Adleman (RSA), Elliptic-Curve Cryptography (ECC)) and protocols.

In the systems implementing such cryptographic systems, it is assumed that the attacker only has access to the input and output of the algorithm performing the cryptographic operation, with the actual processing being performed invisibly in a "black box." For such a model to comply, the black box must provide a secure processing environment. Active research in this domain includes improved and special purpose cryptographic systems (e.g., lightweight block ciphers, authentication schemes, homomorphic public key algorithms), and the cryptanalysis thereof.

While such systems are effective, they are still vulnerable to attack. For example, protocols may be deployed in the wrong context, badly implemented algorithms, or inappropriate parameters may introduce an entry point for attackers.

New cryptanalysis techniques that incorporate additional side-channel information that can be observed during the execution of a crypto algorithm; information such as execution timing, electromagnetic radiation and power consumption. Mitigating such side channel attacks is a challenge, since it is hard to de-correlate this side-channel information from operations on secret keys. Moreover, the platform often imposes size and performance requirements that make it hard to deploy protection techniques.

Further exacerbating the foregoing problems, more applications are being performed on open devices with general purpose processors (e.g. personal computers, laptops, tablets, and smartphones) instead of devices having secure processors.

In response to the foregoing problems, many systems use "white-box" techniques, in which it is assumed that the attacker has full access to the software implementation of a cryptographic algorithm: the binary is completely visible and alterable by the attacker, and the attacker has full control over the execution platform (CPU calls, memory registers, etc.). In such systems, the implementation itself is the sole line of defense.

White-box cryptography was first published by Chow et al. (Stanley Chow, Philip A. Eisen, Harold Johnson, and Paul C. van Oorschot. A white-box DES implementation for DRM applications. In Proceedings of the ACM Workshop on Security and Privacy in Digital Rights Management (DRM 2002), volume 2696 of Lecture Notes in Computer Science, pages 1-15. Springer, 2002, hereby incorporated by reference herein). This addressed the case of fixed key white-box DES implementations. The challenge is to hardcode the DES symmetric key in the implementation of the block cipher. The main idea is to embed both the fixed key (in the form of data but also in the form of code) and random data (instantiated at compilation time) in a composition from which it is hard to derive the original key.

The goal of a white-box attacker is to recover the secret from a white-box implementation. Typically, white-box cryptography is implemented via lookup tables encoded with bijections. Since these bijections are randomly chosen, it is infeasible for an attacker to brute-force the encodings for a randomly chosen secret from a sufficiently large keyspace.

Further, code footprints present a significant problem for typical white-box implementations, which use lookup tables to replace mathematical operations with encoded mathematical operations. For example, if a single operation is to be performed using two one byte (8 bit) numbers, the lookup table will comprise $2^8$ or 256 rows and 256 columns (0 to 255), and will therefore comprise 64K bytes of information that must be stored. Further, computations performed on larger numbers substantially increase storage requirements. For example, if a single operation is to be performed using two 16 bit numbers, the lookup table will comprise $2^{16}*2^{16}$ rows and columns of 16 bit numbers, which requires more than 8.6 gigabytes of storage. Given that typically more than one cryptographic operation is required and that computations may need to be performed in 32 or 64 bits, it can be seen that classical lookup-table-based white-box implementations are not suited to applications that are based on large integers. Further, while the size of the lookup tables may be reduced by breaking cryptographic computations down into smaller integers, a greater number of lookup tables will be required. For example, it has been estimated that to perform RSA computations in a white-box implementation, several thousand one-byte lookup tables would be required.

What is needed is a way to efficiently perform large integer cryptographic operations offering the advantages of white-box implementations that do not expose secrets to compromise, while minimizing the storage and processing requirements of such implementations.

SUMMARY

To address the requirements described above, the present invention discloses a method and apparatus for computing an algorithm $\mathcal{A}$ (m, S) having i operations with input m and secret S. In one embodiment, the method comprises defining a white-box fully-homomorphic key generation function (P, p)←Gen($1^w$) with public-key P and private-key p that selects random prime numbers p, q, s∈W of similar size, wherein B={0, 1}$^b$ is the domain of order b, of the algorithm $\mathcal{A}$, where b>=8, W={0, 1}$^w$ is a white-box domain of order w, for w>>b, p>$2^b$ is a white-box fully-homomorphic private key, N=pq, k=s(p−1), and P=(N, k) is a white-box fully-homomorphic public key. The method further comprises defining a white-box fully-homomorphic encoding function Enc(P, m):=$m^{rk+1}$(mod N) that generates a random integer r∈W, then performs an encoding of the input m∈B, defining a white-box fully-homomorphic decoding function Dec(p, c)=c(mod p) that decodes c by computing c modulo p, and defining i transform key pairs ($T_i$, $t_i$), at least on part from P and p, wherein $T_i$ is the $i^{th}$ transform public key and $t_i$ is the $i^{th}$ transform private key. This can be performed by selecting prime numbers $t_i$, and $q_i$∈W of similar size to p, with $t_i$>$2^b$, computing $N_i$=$p_i p^{-1} q_2$ such that $N_i$ and N are pairwise co-prime, and computing $e_i$=$p_i p^{-1}$−1 where $T_i$=($N_i$, $e_i$)i. The method further comprises accepting an encoded input $c_0$, where $c_0$=Enc(P, m) and generating an encoded output c' by performing, for each of the i operations, accepting an encoded transform public key $T_i$=Enc($t_i$, S), performing the $i^{th}$ operation on the encoded input $c_{i-1}$ and the encoded transform public key in modulo $N_i$ to obtain an encoded output $c_i$ and reencoding $c_i$ with transform $T_i$ without any interim decoding operation. Finally, the method comprises decoding the encoded output c' with the private key p to recover an output m' according to m'=Dec(p, c'), such that m'=$\mathcal{A}$ (m, S).

Other embodiments are evidenced by an apparatus having a processor communicatively coupled to a memory storing processor instructions for performing the foregoing operations.

The foregoing allows white-box implementations that are tunable to maximize performance if needed or to achieve security strength as required. It is applicable for direct application to general-purpose program code, thus reducing the expertise required to build and integrate white-box implementations, while also diminishing the incidence of implementation weaknesses through automation.

BRIEF DESCRIPTION OF THE DRAWINGS

Referring now to the drawings in which like reference numbers represent corresponding parts throughout:

FIGS. 1A and 1B are diagrams of a cryptographic system processing an input message to produce an output message, and its corresponding white-box implementation;

FIG. 2 is a diagram illustrating exemplary operations that can be performed to implement one embodiment of a fully homomorphic white-box implementation (FHWI);

FIG. 5 is a diagram presenting a tabular comparison of processing times for the baseline white-box implementation illustrated in FIG. 1B, and the FHWI implementation shown in FIG. 4;

FIG. 6 is a diagram presenting a tabular comparison of the memory footprint required to implement the baseline white-box implementation illustrated in FIG. 1B and the FHWI implementation illustrated in FIG. 4.

DETAILED DESCRIPTION

Figure 3:
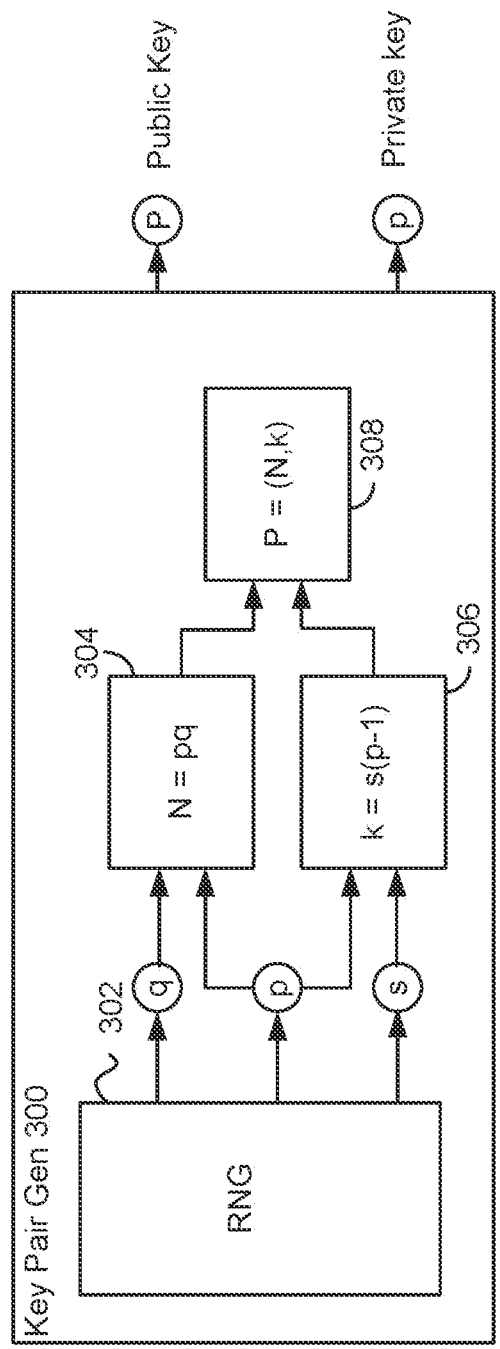
FIG. 3 is a diagram illustrating one embodiment of a key generator for generating a private key p and a public key P.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A fully homomorphic white-box implementation of one or more cryptographic operations is presented below. This method allows construction of white-box implementations from general-purpose code without necessitating specialized knowledge in cryptography, and with minimal impact to the processing and memory requirements for non-white-box implementations. This method and the techniques that use it are ideally suited for securing "math heavy" implementations, such as codecs, that currently do not benefit from white-box security because of memory or processing concerns. Further, the fully homomorphic white-box construction can produce a white-box implementation from general purpose program code, such as C or C++.

Also presented is a strong fully homomorphic white-box construction with that attains semantic white-box security from general-purpose code without necessitating specialist knowledge in cryptography, and with minimal performance and footprint impact. The ideal target for this technology is in securing "math heavy" implementations, such as codecs, that currently do not benefit from white-box security, which among other things will facilitate end-to-end protection of a content pipeline in DRM applications.

In the following discussion, the terms "encoding," "decoding," "encoder," and "decoder," are used to generally describe such performed operations as being possible to implement in smaller domains. The principles discussed herein may also be applied without loss of generality to larger domains, and in such applications, the operations may be classified as "encrypting" and "decrypting."

White-Box Cryptographic Systems

A white-box system operates by encoding data elements (such as secret keys) so that they cannot be recovered by an attacker in their cleartext form. A white-box implementation is generated with mathematically altered functions that operate directly on the encoded data elements without decoding them. This guarantees that the secrets remain encoded at all times, thus protecting the implementation against attackers with full access to and control of the execution environment. This is described, for example, in the Chow reference cited above.

FIGS. 1A and 1B are diagrams of a cryptographic system processing an input message to produce an output message, and its corresponding white-box implementation.

As illustrated in FIG. 1A, the algorithm performs functions $f_1$, $f_2$ and $f_n$ (102A, 102B, and 102N, respectively) when provided with an input and secret S.

In FIG. 1B, each operation $f_1, f_2, \ldots, f_n$ in an original algorithm $\mathcal{A}$ (m, S) with input message m and secret S is encoded as a lookup-table $T_1, T_2, \ldots, T_n$ (104A, 104B, and 104N, respectively) in the classical white-box implementation of that algorithm. The encodings are generated as two sequences of random bijections, $\delta_1, \delta_2, \ldots, \delta_{n+1}$ that are applied to the inputs and output of each operation, where $\rho(S)$ represents an encoded secret (e.g. a secret key), which is either linked statically or provided dynamically to the white-box implementation.

In the white-box implementation shown in FIG. 1B this is implemented by applying bijections $\delta_1$ and $\rho(S)$ as an input to lookup table $T_1$ to obtain an intermediate output, applying the intermediate output and $\rho(S)$ to lookup table $T_2$ to produce a second intermediate output, then providing the second intermediate output and $\rho(S)$ to lookup table $T_3$ to produce output $\delta_{n+1}^{-1}(\cdot)$. Lookup table $T_1$ inverts the bijection $\delta_1$ of the input by $\delta_1^{-1}$, inverts the bijection $\rho$ of $S(\rho(S))$ by $p_1^{-1}$, applies $f_1$ and then applies bijection $\delta_2$ to produce the first intermediate output. Similarly, lookup table $T_2$ inverts the bijection $\delta_2$ of the first intermediate input by $\delta_2^{-1}$, inverts the bijection $\rho$ of $S(\rho(S))$ by $p_2^{-1}$, applies $f_2$ and then applies bijection $\delta_3$ to produce the first intermediate output. Generally, final lookup table $T_n$ inverts the bijection $\delta_n$ of the $n-1^{th}$ intermediate input by $\delta_n^{-1}$, inverts the bijection $\rho$ of $S(\rho(S))$ by $p_n^{-1}$, applies $f_n$ and then applies bijection $\delta_{n+1}$ to produce the intermediate output $\delta_{n+1}^{-1}(\cdot)$. The bijections $\delta_1$ and $\delta^{-1}$, referred to as external encodings, are computed outside the white-box implementation.

White-box implementations are usually of cryptographic primitives (such as the advanced encryption standard or AES) and chains of cryptographic primitives used in cryptographic protocols (such as elliptic curve Diffie-Hellman key exchange, or ECDHE). Designing and coding these implementations requires specialist knowledge of white-box cryptography to attain the best possible security properties. Just as importantly, integration with white-box implementations also requires a degree of specialist knowledge to avoid common pitfalls that can negate the white-box security such as:

Exposed secrets: The most common weakness in white-box systems is exposing secrets in cleartext form. Secrets that are exposed (no matter how briefly!) allow an attacker to bypass the white-box protection entirely. Secrets should remain in encoded form at all times on insecure host machines.

Path to cleartext for encoded secrets: A common flaw is to allow secrets to be able to be transformed to cleartext in one or more steps. This is often a result of testing during development to ensure secret keys are being correctly stored; but if these transforms are left in the white-box implementation at runtime it gives an attacker the ability to decode secrets directly with negligible work-factor. The capability to encode or decode secrets should never be present on insecure host machines.

Inappropriate encoding methods selected for the type of data: White-box systems often provide different encoding methods to suit different types of data, such as:

Encoded secrets should be used for keys and other random data elements that are required to be kept secret. These elements should remain in encoded form at all times.

Encryption or stream encoding should be used for encoding free-format text or other structured data elements.

External encodings should be used for the data that requires the lowest security, such as data that is already strongly encrypted or data that is intended to be in the clear at some point on the host machine.

Side-channel weaknesses: An attacker may be able to gain information about the encoded secrets by observing the control-flow of the white-box implementation or the calling application. Conditional logic should be avoided in relation to encoded data.

Lack of encoding diversity: White-box systems allow the assignment of fixed encoding identifiers to enable secrets to be securely chained to and from external systems. Reuse of fixed encoding identifiers is discouraged.

Security vs efficiency tradeoff: There is a temptation to use tuning parameters provided in white-box systems to minimize security so as to maximize performance or reduce code footprint. Security tradeoffs should only be considered if the efficiency of the white-box implementation falls below acceptable levels.

Public Key Cryptography

Public key encryption schemes use a pair of keys: a public key which may be disseminated widely, and a private key which are known only to the owner. The message is encrypted according to the public key, and the public key is publicly shared. However, decrypting the message requires the private key, which is only provided to authorized recipients of the encrypted data. This accomplishes two functions: authentication and encryption. Authentication is accomplished because the public key can be used to verify that a holder of the paired private key sent the message. Encryption is accomplished, since only a holder of the paired private key can decrypt the message encrypted with the public key.

A public-key encryption scheme is a triple (Gen, Enc, Dec), with a probabilistic-polynomial-time (PPT) key-pair generator algorithm Gen, PPT encryption algorithm Enc and PPT decryption algorithm Dec, such that for any public/private key-pair (e, d)$\leftarrow$Gen($1^\ell$) and all messages m of length $\ell$ it holds that m=Dec(d, Enc(e, m)).

Homomorphic Cryptographic Operations

Fully homomorphic encryption schemes preserve underlying algebraic structure, which allows for performing operations in an encrypted domain without the need for decryption, as described in "On data banks and privacy homomorphisms," by Ronald L Rivest, L Adleman, and M L Dertouzos, Foundations of Secure Computation, 32(4): 169-178, 1978, which is hereby incorporated by reference herein.

As used herein, a fully homomorphic encryption scheme is an encryption scheme with the following property: Given two encryption operations Enc(e, $m_1$) and Enc(e, $m_2$), where $m_1$ and $m_2$ are two messages encrypted with a chosen public key e, one can efficiently and securely compute c=Enc(e, $m_1 \odot m_2$)=Enc(e, $m_1$)$\odot$Enc(e, $m_2$) without revealing $m_1$ and $m_2$, such that Dec(d, c)=$m_1 \odot m_2$, wherein the operation $\odot$ is multiplication or addition.

Thus, homomorphic cryptography is a form of cryptography that permits computation on encrypted data or ciphertexts, which, when decrypted, provides the same result as would have been provided if the computations were performed on the unencrypted or plaintext. Hence, homomorphic cryptography permits the performance of one or more cryptographic operations, while not exposing the secrets used in such operations.

White-Box Fully Homomorphic Cryptographic Processing

A number-theoretic white-box encoding scheme that is suited to arithmetic operations in common use in software applications is presented below. The encoding scheme is based on Fermat's Little Theorem, which states that if p is a prime number and if α is any integer not divisible by p, then $\alpha^{p-1}-1$ is divisible by p.

A white-box fully homomorphic encoding scheme (WBFHE) can be defined as follows. Let $B=\{0, 1\}^b$, $b \geq 8$ be the integral domain of the arithmetic operations in the original algorithm (e.g. the one or more operations depicted in FIG. 1A). The term b represents the order of the integral domain. For example, if b=8, integral domain B consists of $2^8$ possible values. Further, let $W=\{0, 1\}^w$, $w \gg b$ be the white-box domain, such that Enc: $W \times B \rightarrow W$ is a WBFHE encoding and Dec: $W \times W \rightarrow B$ is a WBFHE decoding. The term w refers to the order of the white-box domain. For example, if w=1000, the white-box domain includes $2^{1000}$ possible values.

Three functions (Gen, Enc, and Dec) are defined. The Gen function selects three random prime integers p, q, s∈W of similar size (e.g. same order of magnitude), where $p > 2^b$ is the private key. Let N=pq and let k=s(p−1) such that P=(N, k) is a public key, where keypair generation is denoted by:

$$(P,p) \leftarrow Gen(1^w) \qquad \text{Equation (1)}$$

The Enc function generates a random integer r∈W, then an encoding of input message m∈B is defined as:

$$c = Enc(P,m) := m^{rk+1} \pmod{N} \qquad \text{Equation (2)}$$

The Dec function decodes c to recover an encoded message m by computing c modulo p as follows:

$$m = Dec(p,c) := c \pmod{p} \qquad \text{Equation (3)}$$

The order w of the white-box domain W is a parameter that can be adjusted or tuned to increase or decrease security to obtain the desired level of performance from the white box implementation. If w is sufficiently large, then WBFHE can be considered an encryption scheme with semantic security, as described below.

The foregoing WBFHE is multiplicatively and additively homomorphic. These properties can be validated as follows:
Let $(P, p) \leftarrow Gen(1^w)$ and choose $m_1, m_2 \in B$. If the following encryptions are computed:

$$c_1 = Enc(P,m_1) = m_1^{r_1k+1} \pmod{N} = m_1^{r_1s(p-1)+1} \pmod{N} \qquad \text{Equation (4)}$$

$$c_2 = Enc(P,m_2) = m_2^{r_2k+1} \pmod{N} = m_2^{r_2s(p-1)+1} \pmod{N} \qquad \text{Equation (5)}$$

It can be shown that:

$$m_1 m_2 = Dec(p, c_1 c_2) = c_1 c_2 \pmod{p} \qquad \text{Equation (6)}$$

and $$m_1 + m_2 = Dec(p, c_1 + c_2) = c_1 + c_2 \pmod{p} \qquad \text{Equation (7)}$$

For example, consider a small integer domain for purposes of illustration where:
message one=$m_1$=8
message two=$m_2$=11
private key=p=101
first random integer=$r_1$=219
second random integer=$r_2$=112 and
third random prime number s=97
Substituting these values into Equations (6) and (7), respectively yields Equations (8) and (9) below:

$$4250 = Enc(P,m_1) = m^{r_1k+1} \pmod{N} = m_1^{219 \cdot 97(101-1)+1} \pmod{8989} \qquad \text{Equation (8)}$$

$$2132 = Enc(P,m_2) = m^{r_2k+1} \pmod{N} = m_2^{112 \cdot 97(101-1)+1} \pmod{8989} \qquad \text{Equation (9)}$$

Homomorphic Addition can be Shown Because:

$$m_1 + m_2 = Dec(p, m_1 + m_2) = 4250 + 2132 \pmod{101} \qquad \text{Equation (10)}$$

$$8 + 11 = 6382 \pmod{101} \qquad \text{Equation (11)}$$

$$19 = 19$$

Homomorphic multiplication can be shown because:

$$m_1 * m_2 = Dec(p, m_1 * m_2) = 4250 * 2132 \pmod{101} \qquad \text{Equation (12)}$$

$$8 * 11 = 9061000 \pmod{101} \qquad \text{Equation (13)}$$

$$88 = 88$$

Further, since the foregoing white-box implementation is both multiplicatively and additively homomorphic, it is fully homomorphic.

FIG. 2 is a diagram illustrating exemplary operations that can be performed to implement one embodiment of a fully homomorphic white-box implementation. FIG. 2 will be discussed in conjunction with FIGS. 3 and 4, which depict one embodiment of a key pair generator 300 and a fully homomorphic white-box implementation 400 corresponding to the processing system depicted in FIG. 1A, respectively.

Turning first to FIG. 2, block 210 encodes an input message m to compute an encoded input c. This can be accomplished using encoder 404 depicted in FIG. 4 according to Equation (2) above.

Figure 4:
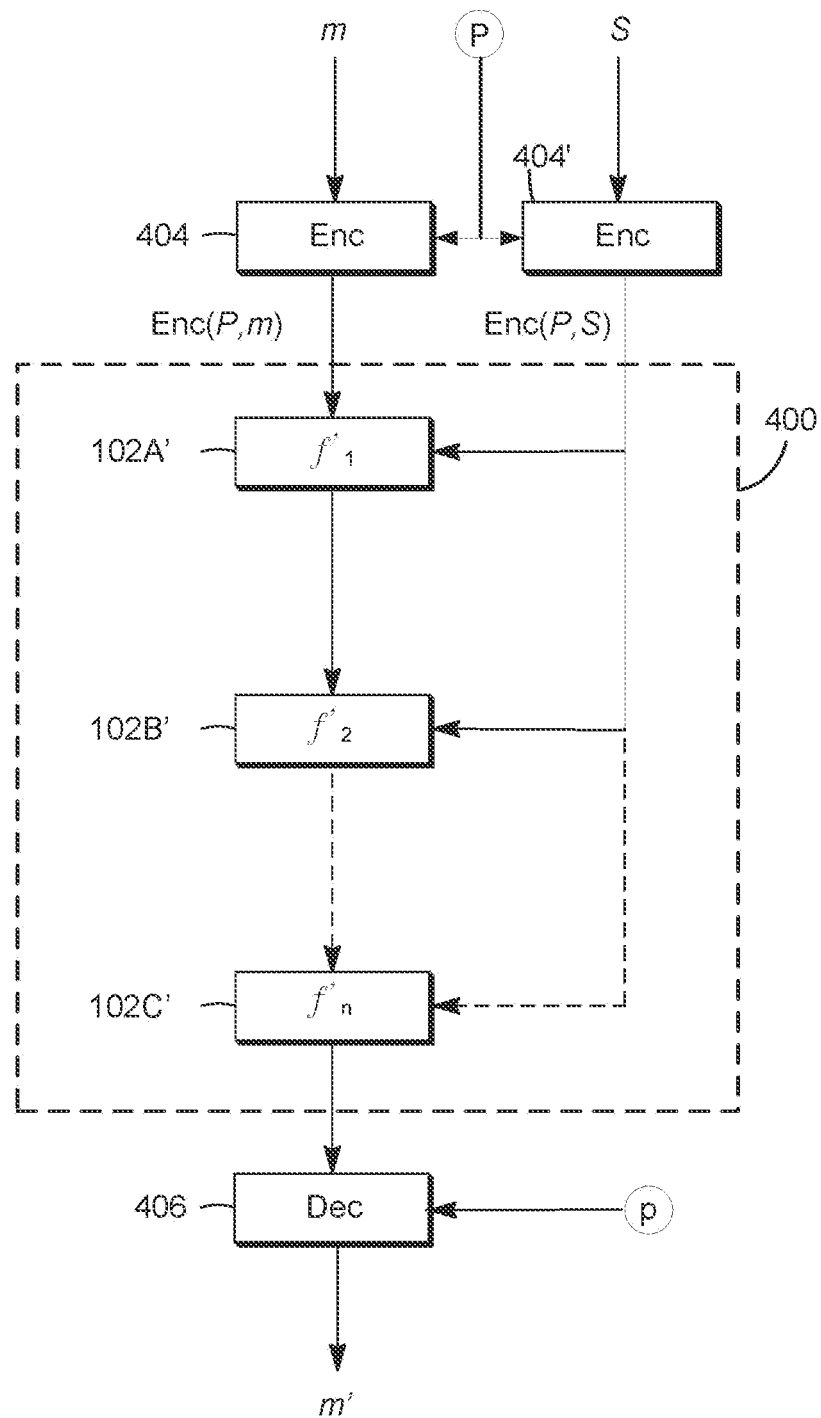
FIG. 4 is a diagram illustrating one embodiment of a fully homomorphic white-box implementation.

The private key p and public key P=(N, k) is generated by the key pair generator 300 depicted in FIG. 3, which comprises a random number generator (RNG) 302 for generating random prime numbers p, q and s such that p, q, s∈0, $1^w$. The key generator 300 provides the random prime number p as the private key and a public key P=(N, k) computed as a tuple of N by element 308, and N is a product of random prime numbers p and q (as computed by multiplication element 304) and k=s(p−1), as computed by element 306. The factor r in Equation (2) is a random integer that need not be prime.

Turning again to FIG. 2, block 212 encodes a secret S to compute an encoded secret S'. This can be accomplished by using encoder 404' depicted in FIG. 4 according to Equation (2), with the Enc function is performed on secret S. The factor r used to compute encoded secret S' is a random integer that need not be prime. This second random integer may be generated by a random integer generator in the encoder 404' illustrated in FIG. 4, or may be generated by the random number generator 302 of the key pair generator 300 illustrated in FIG. 3 and provided to the encoder 404'.

Returning to FIG. 2, the encoded input c and the encoded secret S' are transmitted from the transmitter 202 to the receiver 204, as shown in block 214. The receiver 204 accepts the transmitted encoded input c and the transmitted encoded secret S', as shown in block 216, and performs one or more cryptographic operations according to the encoded input message c and the encoded secret S' to compute an encoded output c'. These operations are performed modulo N. The resulting encoded output c' is then decoded using private key p to recover the output message m' as shown in block 222. The decryption may be performed, for example by generating the output message m' according to the Dec function of Equation (3) applied to c', or:

$$m' = Dec(p, c') = c' \pmod{p} \qquad \text{Equation (14)}$$

Note that since all of the operations $f'_1$, $f'_2$ and $f'_n$ are performed on encoded data (e.g. the data is not decoded until all of the operations $f'_1$, $f'_2$ and $f'_n$ have been performed), where it is difficult for an attacker to use the intermediate results of such calculations to divine the value of the secret S. This property is made possible by the homomorphic character of the white-box processing system, which permits the operations to be performed on the encoded data rather than requiring the data be decoded before the operations are performed.

Further, as described above, the order a of the white-box domain W can be selected to provide the desired level of security. In other words, the larger the domain from which the random prime integers p, q, s and random integers rare chosen from, the more security is provided. For example, if the numbers p, q and s are of at least w bits in size where w is much greater than (>>) b where b is the order of the integral domain B of the original operations $f_1$, $f_2$ and $f_n$ (i.e., if the input message m may comprise an integer of at least b bits in size), semantic cryptographic security may be obtained.

The operations depicted in FIG. 1A comprise the serial performance of functions $f_1$, $f_2$ and $f_n$: (102A, 102B, and 102N, respectively) using secret S. The same functions are performed in the fully homomorphic white-box implementation 400 depicted in FIG. 4, but are performed in the white-box domain W, a difference of functionality that is indicated by $f'_1$, $f'_2$, and $f'_n$ (102A', 102B', and 102N', respectively).

For exemplary purposes, consider a case where the one or more operations comprise $f_1$ and $f_2$, with $f_1$ and $f_2$ defined as follows for inputs ($x_2 y$) as follows:

$$f_1(x_2 y) = x+y \quad \text{Equation (15)}$$

$$f_2(x_2 y) = xy \quad \text{Equation (16)}$$

wherein operation $f'_1$ computes the sum of the encoded input message m and encoded secret S' modulo N to compute intermediate output, operation $f'_2$ computes the product of the intermediate output and the encoded secret S' modulo N to compute the output, which is the encoded output c'. Hence, each operation $f_1$, $f_2$:B×B→B is implemented in the white-box domain $f'_1$, $f'_2$:W×W→W. Further, as demonstrated below, since the cryptographic operations are homomorphic in both addition and multiplication, they are fully homomorphic.

While the foregoing example uses two functions $f_1$ and $f_2$, a greater number of functions may be used while maintaining the homomorphic character of the implementation. Since many other functional relationships can be described as various combinations of addition or multiplication, a wide variety of functions can be implemented with such combinations.

Note that since all of the operations $f'_1$, $f'_2$ and $f'_n$ are performed on encoded data (e.g. the data is not decrypted until all of the operations $f'_1$, $f'_2$ and $f'_n$ have been performed), it is difficult for an attacker to use the intermediate results of such calculations to divine the value of the secret S. This property is made possible by the homomorphic character of the white-box processing system, which permits the operations to be performed on the encoded data rather than requiring the data be decrypted before the operations are performed.

Functional Allocation Among Elements

Importantly, the process of key generation, the encoding of the secret and decoding of any data is performed external to the white-box implementation 400 and in a secure environment. Further, if the private key (p) is to be disseminated to the receiver of the message for use, such dissemination must be performed securely.

For example, if key generation were performed in the white-box implementation 400 itself, an attacker could intercept the generated private key component (p) and use it to decode any encoded data in the white-box implementation 400, including the encoded secret (S). For example, if the white-box implementation is of RSA and the secret S represents the RSA private key, then an attacker could simply use S in non-white-box RSA to decrypt the input, bypassing the white-box implementation 400 entirely. Further, with respect to encoding the secret S (performed by encoder 404'), such encoding of the secret S requires knowledge of the unencoded secret S. Therefore, if the encoding were performed on an insecure device, the secret S would be exposed because it is an input to the encoding operation. Since the unencoded secret could be used in a non-white-box version of the cryptosystem to carry out the original cryptographic operation, the protection afforded by the white-box implementation 400 would be negated. Finally, with respect to the decoding of data, such decoding requires knowledge of the private key (p), and an attacker with knowledge of the private key can decode the encoded secret S and use this in a non-white-box version of the cryptosystem to carry out the original cryptographic operation.

Semantic Security of the WBFHE

Encryptions can be described as having a property of indistinguishability. This is described in "A uniform-complexity treatment of encryption and zero knowledge," by Oded Goldreich, Journal of Cryptology: The journal of the International Association for Cryptologie Research (LACR), 6(1):21-53, 1993, which is hereby incorporated by reference. The indistinguishability property states that it is infeasible to find pairs of messages for which an efficient test can distinguish corresponding encryptions.

An algorithm $\mathcal{A}$ may be said to distinguish the random variables $R_n$ and $S_n$ if $\mathcal{A}$ behaves substantially differently when its input is distributed as $R_n$ rather than as Sn. Without loss of generality, it suffices to ask whether $Pr[\mathcal{A} (R_n)=1]$ and $Pr[\mathcal{A} (S_n)=1]$ are substantially different.

An encryption scheme (Gen, Enc, Dec) has indistinguishable encryptions if for every polynomial-time random variable $\{T_n = X_n Y_n Z_n\}_{n \in N}$ with $|X_n|=|Y_n|$, every probabilistic polynomial-time algorithm $\mathcal{A}$, every constant c>0 and all sufficiently large n, and a fixed P←Gen{$1^n$}, $$|Pr[_c\mathcal{A}(Z_n, Enc(p, X_n)) = 1] - Pr[_c\mathcal{A}(Z_n, Enc, (P, Y_n)) = 1| < \frac{1}{n_c} \quad \text{Equation (16)}$$

The probability in the above terms is taken over the probability space underlying $T_n$ and the internal coin tosses of the algorithms Gen, Enc and $\mathcal{A}$.

It has also been shown that semantic security is equivalent to indistinguishability of encryptions, which allows proof that a WBFHE described above are semantically secure for a sufficiently large white box domain W. See, for example "Probabilistic encryption & how to play mental poker keeping secret all partial information," by Shafi Gokdwasser and Silvio Micali, STOC '82 Proceedings of the Fourteenth Annual ACM symposium on Theory of computing, pages 365-377, 1982, which is hereby incorporated by reference herein. The proof is provided as follows:

If we choose a random m∈ B and public key P←Gen{$1^n$}, and suppose that an encryption process Enc for two encryptions $c_1$=Enc(P, m) and $c_2$=Enc(P, m) is not probabilistic. Then $c_1$=$c_2$. But since the encryption process Enc chooses r∈W at random for each encryption, $$Pr[c_1 = c_2] = \frac{1}{2^w},$$

which is negligible. This is a contradiction. Hence, Enc is probabilistic, and thus if w were sufficiently large, an adversary without knowledge of r has a negligible advantage of using knowledge of Enc to compute the same ciphertext as an oracle implementation of Enc(P, m).

A connection can also be shown between the WBFHE and the integer factorization problem, where it is noted that no efficient (polynomial time) integer factorization algorithm (as discussed in "Number Theory for Computing," by Song Y Yan, Springer Berlin Heidelberg, 2002, hereby incorporated by reference herein. If a PPT algorithm $\mathcal{F}$ can factor N=pq or k=s(p−1), then there exists a PPT algorithm $\mathcal{G}$ that can invert Enc(P, m). This is apparent because the WBFHE private key p is a prime factor of N and also (p−1) is a factor of k.

Exemplary Applications

The foregoing principles can be applied to any cryptographic function having one or more cryptographic operations, including digital signatures and their use, encryption and decryption. For exemplary purposes, an application to the decryption of an RSA encrypted message is described. In this case, the algorithm $\mathcal{A}$ is an RSA decryption algorithm. Further, the accepted encoded message is c=Enc(P, M), wherein M is an RSA encrypted version of the input message m encoded with the public key P, and the accepted encoded secret is S'=Enc(P, RSAPVK), wherein RSAPVK is the RSA private key encoded with the public key P. In this case, the one or more cryptographic operations comprise RSA decrypt operations on the encoded input c and the encoded secret S' to compute the encoded output c'. Hence, the RSA decrypt operations operate on the encrypted version of the input message M and the encoded version of the RSA private key, RSAPVK to produce an encoded output c' without exposing the RSA private key, and the original message m can be recovered using the private key p according to m=Dec(p, c').

Another exemplary application of the foregoing principles involves the decryption of programs that have been compressed, for example according to an MPEG (motion pictures working guild) standard. Typically, a media program is compressed, the compressed version of the media program encrypted and thereafter transmitted. The compressed and encrypted media program is received by the receiver, decrypted, then decompressed. Once decrypted, the media program is exposed in compressed form and is vulnerable to compromise before the decompression process. Further, the media program is exposed in compressed form which is of smaller size and can be more easily disseminated to unauthorized viewers.

Using the foregoing principles, the media program is also compressed according to the MPEG standard, and thereafter encoded or encrypted before dissemination. The media program may then be decompressed using a homomorphic implementation using one or more operations. However, the resulting decompressed media program is still in encoded or encrypted form, and is unviewable until the decoding step is applied. At this point, even if the media program were compromised, it would be of much larger size and more difficult to disseminate to unauthorized viewers.

Test Results

Tests were performed with a prototype fully homomorphic white-box implementation (FHWT) written in C++ consisting of 10,000 iterated additions and multiplications. The baseline was computed using built-in 64 bit integral types. An ESCP VLI library was used for the FHWI large integer operations.

FIG. 5 is a diagram presenting a tabular comparison of processing times for the baseline white-box implementation illustrated in FIG. 1B, and the FHWI implementation shown in FIG. 6. Note that the FHWI can take from 3.2 to 144 more time to perform an iteration than the baseline white-box implementation. Note also that the performance penalty is a function of u, so w may be chosen to obtain a desired security level, while minimizing processing penalties.

FIG. 6 is a diagram presenting a tabular comparison of the memory footprint required to implement the baseline white-box implementation illustrated in FIG. 1B and the FHWI implementation illustrated in FIG. 6. Note that the FHWI results in significant footprint reductions (the memory footprint required for the implementation is reduced by a factor of about 64 (w=1024) to 114 (w=128).

Strong Fully Homomorphic White-Box Construction

A strong fully homomorphic white-box construction having the goal of attaining semantic white-box security from general-purpose code without necessitating specialist knowledge in cryptography, and with minimal performance and footprint impact is discussed below. The ideal target for this technology is in securing "math heavy" implementations, such as codecs, that currently do not benefit from white-box security, which among other things will facilitate end-to-end protection of a content pipeline in DRM applications.

The strong fully homomorphic white-box (SFHWB) construction generates white-box implementations from general purpose program code, such as C or C++. In the discussion below we introduce the strong fully homomorphic white-box encoding scheme (SFHWBE), show our construction of a fully homomorphic white-box implementation, show a proof of semantic security, and conclude with performance results from our SFHWB prototype indicating a lower-bound 1.16× overhead for lightweight operations and typical ~3× overhead for cryptographically secure implementations. Performance improvements in fully optimized implementations are expected.

Strong Fully Homomorphic White-Box Encoding

We propose a number-theoretic white-box encoding scheme that is suited to arithmetic operations in common use in software applications. More formally, our strong fully homomorphic white-box encoding (SFHWBE) scheme is based on Fermat's little Theorem, which states that if p is a prime number and a is any integer not divisible by p, then a $d^{-1}$−1 is divisible by p. We extend this notion by incorporating the Chinese Remainder Theorem (discussed above) to permit rekeying and securely transforming white-box state in a similar manner to randomized bijections in traditional table-based white-box implementations such as those shown in FIG. 1.

Chinese Remainder Theorem

Let $n_1, \ldots, n_k$ be positive integers that are pairwise coprime. For any integers $a_1, \ldots, a_k$, the system of linear congruences $$x \equiv \begin{cases} \alpha_1 \bmod n_1 \\ \ldots \\ \alpha_k \bmod n_k \end{cases} \quad \text{Equation (17)}$$

has a solution x=v. Additionally, x=u is a unique solution if and only if $$u \equiv v (\bmod\ n_1 \ldots n_k) \quad \text{Equation (18)}$$

This can be shown as follows. Let $n = n_1 \ldots n_k$, then for each $i=1, \ldots, k$, let:

$$y_i = \frac{n}{n_i} = n_1 \ldots n_{i-1} n_{i+1} \ldots n_k \quad \text{Equation (19)}$$

Since $y_i$ and $n_i$ are pairwise coprime it follows that there exists a multiplicative inverse of:

$$y_i z_i = y^{-1} (\bmod\ n_i) \quad \text{Equation (20)}$$

for each i. We write:

$$x \equiv \sum_1^k a_i y_i z_i (\bmod\ n_i) \quad \text{Equation (21)}$$

Since $y_j \equiv 0\ (\bmod\ n_i)$ for each $j \neq i$, we can write:

$$x_i \equiv a_i y_i z_i (\bmod\ n_i) \quad \text{Equation (22)}$$

Cancellation of inverses $y_i z_i \equiv 1\ (\bmod\ n_i)$ for each i allows us to write:

$$x \equiv a_i (\bmod\ n_i) \quad \text{Equation (23)}$$

To prove uniqueness, suppose that there are two solutions u and v to equation (14), then:

$$n_i | (u-v) \quad \text{Equation (24)}$$

for each i. Since each $n_1, \ldots, n_k$ is coprime we have that:

$$n_1 \ldots n_k | u-v,\ \text{or}$$

$$u \equiv v (\bmod\ n_1 \ldots n_k) \quad \text{Equation (25)}$$

hence, the solution is unique modulo $n_1 \ldots n_k$.

We also of note the modular conversion lemma: If $a_1 (\bmod\ n_1) \equiv a_2 (\bmod\ n_2)$ then $$a_1 - n_1 q_1 = a_2 - n_2 q_2 \quad \text{Equation (26)}$$

$$a_1 = a_2 - n_2 q_2 + n_1 q_1 \quad \text{Equation (27)}$$

for some integers $q_1$ and $q_2$.

We define a strong fully homomorphic white-box encoding scheme (SFHWBE) as follows. Let $B = \{0, 1\}^b$, $b \geq 8$ be the integral domain of the arithmetic operations in the original application and let $W = \{0, 1\}^w$, $w \gg b$ be the white-box domain. We denote a SFHWBE scheme by the tuple (Gen, Enc, Dec, Tgen, Tx, W, B) with the following properties (Tx, W, and B are used in addition to Gen, Enc, and Dec, which are used in the WBFHE discussed above).

First, Gen is a SFHWBE keypair generator. Let p, q, $s \in W$ be three prime numbers of similar size selected at random. Let p be the private key, where $p > 2^b$ and let N=pq and let e=s (p−1) where P=(N, e) denotes the public key.

$$(P,p) \leftarrow \text{Gen}(1^w) \quad \text{Equation (28)}$$

Second, Enc is a SFHWBE encoding $W \times B \to W$ that selects a random integer $r \in W$ then encodes a message $m \in B$ with public key P, defined as:

$$c = \text{Enc}(P,m) := m^{re+1} (\bmod\ N) \quad \text{Equation (29)}$$

Third, Dec is a SFHWBE decoding $W \times W \to B$ that decodes a ciphertext c with private key p to recover the message m, defined as:

$$m = \text{Dec}(p,c) := c (\bmod\ p) \quad \text{Equation (30)}$$

Fourth, Tgen is a SFHWBE transform key generator that selects a primes $p_2$, $q_2$, $\in W$ of similar size to p, with new private key $p_2 > 2^b$ and let $N_2 = p_2 p^{-1} q_2$ such that N and $N_2$ are pairwise co-prime. Then let $e_2 = p_2 p^{-1} 1$, where $T = (N_2, e_2)$ denotes a transform public key.

$$(T,p_2) \leftarrow \text{Tgen}(P,p) \quad \text{Equation (31)}$$

Fifth, Tx re-encodes a ciphertext $c_1$ with transform public key $T_2$ without an interim decoding operation.

$$c_2 = \text{Tx}(T_2, c_1) \quad \text{Equation (32)}$$

Gen and Tgen are necessarily computed in a secure setting to avoid exposure of the private key components. Dec may be computed within the implementation for states that are not required to be secure, where it is important to note that the exposure of any single private key does not expose other keys.

The order w of the white-box domain is a security parameter that can be tuned to increase or decrease security to obtain a desired level of performance from the white-box implementation. If r is sufficiently large, then SFHWBE can be considered an encryption scheme with semantic security, as described below.

We validate the multiplicative and additive homomorphic properties of SFHWBE in the following lemma in which SFHWBE is fully homomorphic. This can be shown as follows. It (P, p)←Gen ($1^w$) then choose $m_1, m_2 \in B$. Suppose we compute the following encryptions:

$$c_1 = \text{Enc}(P,m_1) = m_1^{r_1 e+1} (\bmod\ N) = m_1^{r_1 e(p-1)+1} (\bmod\ N) \quad \text{Equation (33)}$$

$$c_2 = \text{Enc}(P,m_2) = m_2^{r_2 e+1} (\bmod\ N) = m_2^{r_2 e(p-1)+1} (\bmod\ N) \quad \text{Equation (34)}$$

As was the case with WBFHE, it is easy to check that:

$$m_1 m_2 = \text{Dec}(p, c_1 c_2) = c_1 c_2 (\bmod\ p) \quad \text{Equation (35)}$$

and $$m_1 + m_2 = \text{Dec}(p, c_1 + c_2) = c_1 + c_2 (\bmod\ p) \quad \text{Equation (36)}$$

For example, again consider a small integer domain for the purposes of illustration. Let $m_1=8$, $m_2=11$, $p=101$, $q=89$, $r_1=219$, $r_2=112$, $s=97$, then:

$$4250 = \text{Enc}(P,m_1) = m^r 1e+1 (\bmod\ N) = 8^{219 \cdot 97(101-1)+1} (\bmod\ 8989) \quad \text{Equation (37)}$$

$$2132 = \text{Enc}(P,m_2) = m^r 2e+1 (\bmod\ N) = 11^{112 \cdot 97(101-1)+1} (\bmod\ 8989) \quad \text{Equation (38)}$$

Homomorphic addition is performed as follows:

$$m_1 + m_2 = \text{Dec}(p, c_1 + c_2) = 4250 + 2132 (\bmod\ 101) \quad \text{Equation (24)}$$

$$8 + 11 = 6382 (\bmod\ 101) \quad \text{Equation (24)}$$

$$19 = 19 \quad \text{Equation (24)}$$

Homomorphic multiplication is performed as follows:

$$m_1 m_2 = Dec(p, c_1 c_2) = 4250 \cdot 2132 \pmod{101} \quad \text{Equation (24)}$$

$$8 \cdot 11 = 9061000 \pmod{101} \quad \text{Equation (24)}$$

$$88 = 88 \quad \text{Equation (24)}$$

Strong Fully Homomorphic White-Box Implementation

The construction of a strong fully homomorphic white-box implementation (SFHWB) is a departure from the lookup-table approach taken in traditional white-box implementations of Chow et al.

First, because SFHWBE preserves the arithmetic structure, the operations in the SFHWB compute the same functions as the original application. Therefore, there are no lookup-tables in the SFHWB. Instead, the SFHWB functions are modified to operate over the white-box domain W.

Second, external input encoding and output decoding is respectively performed with the Enc and Dec algorithms, where we note that only the Enc algorithm has a modular exponentiation operation. Dec, Tx and all SFHWB functions are performed with fast arithmetic operations.

Figure 7:
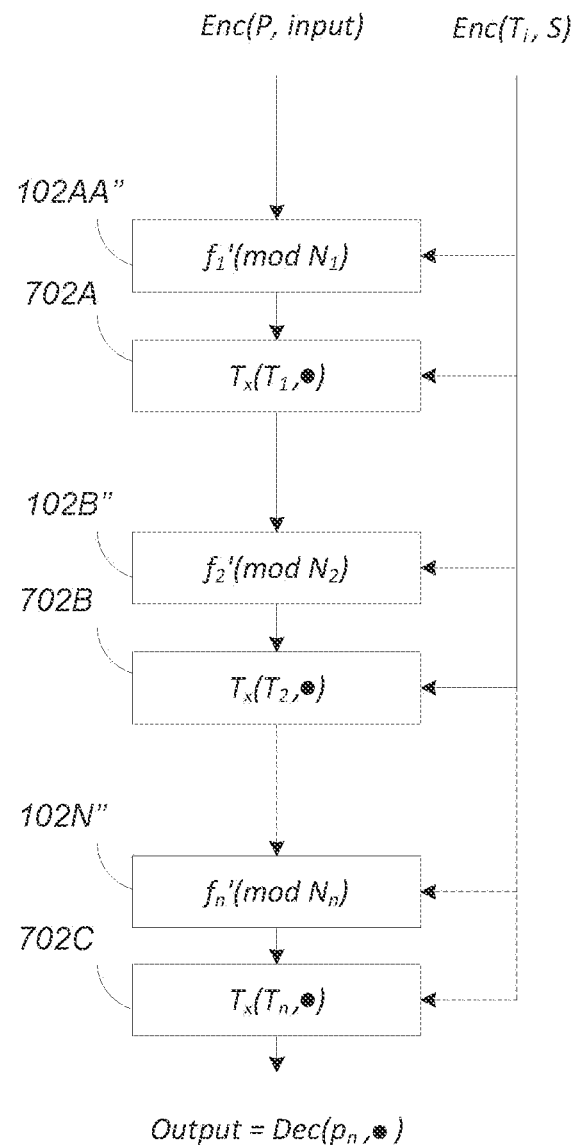
FIG. 7 is a diagram illustrating a strong fully homomorphic white-box implementation.

FIG. 7 is a diagram illustrating a strong fully homomorphic white-box implementation. Each operation $f_1, f_2, \ldots, f_n : B \times B \rightarrow B$ in the original algorithm (102A-102N) are implemented over the white-box domain $f'_1, f'_2, \ldots, f'_n : W \times W \rightarrow W$. The Tx operations (702A-702N) re-encode the output of the preceding operation without an intermediate decoding step using a transform public key. The input and secret encodings are implemented with the Enc algorithm and the output decoding is implemented with the Dec algorithm.

Semantic Security of the SFHWB

The semantic security of the SFHWB can be shown in the same way as the semantic security of the WBFHE was shown above. For completeness, this demonstration is presented below.

Goldreich (cited above) describes the indistinguishability of encryptions property, which states that it is infeasible to find pairs of messages for which an efficient test can distinguish the corresponding encryptions. Loosely speaking, an algorithm $\mathcal{A}$ is said to distinguish the random variables $R_n$ and $S_n$ if behaves substantially differently when its input is distributed as $R_n$ rather than as $S_n$. Without loss of generality, it suffices to ask whether $\Pr[\mathcal{A}(R_n) = 1]$ and $\Pr[\mathcal{A}(S_n) = 1]$ are substantially different.

Indistinguishability of encryptions are defined as follows. An encryption scheme (Gen, Enc, Dec) has indistinguishable encryptions if for every polynomial-time random variable $\{T_n = X_n Y_n Z_n\}_{n \in N}$ with $|X_n| = |Y_n|$, every probabilistic polynomial-time algorithm A, every constant $c > 0$, all sufficiently large n and a fixed $P \leftarrow \text{Gen}(1^n)$, $$|\Pr[\mathcal{A}(Z_n, Enc(P, X_n)) = 1] - \Pr[\mathcal{A}(Z_n, Enc(P, Y_n)) = 1]| < 1/n^c \quad \text{Equation (24)}$$

The probability in the above terms is taken over the probability space underlying $T_n$ and the internal coin tosses of the algorithms Gen, Enc and $\mathcal{A}$.

Goldreich also proved that semantic security is equivalent to indistinguishability of encryptions, which allows us to state the following theorem with accompanying proof that SFHWBE is semantically secure (for a sufficiently large white-box domain).

If a random $m \in B$ and public key $P \leftarrow \text{Gen}(1^n)$ are chosen, then suppose for two encryptions $c_1 = \text{Enc}(P, m)$ and $c_2 = \text{Enc}(P, m)$ that Enc is not probabilistic. Then, $c_1 = c_2$. But since Enc chooses $r \in W$ at random for each encryption, $\Pr[c_1 = c_2] = 1/2^W$, which is negligible. This is a contradiction: Hence Enc is probabilistic; and thus if w is sufficiently large, an adversary without knowledge of r has a negligible advantage of using knowledge of Enc to compute the same ciphertext as an oracle implementation of Enc (P, m).

In the following, we show the connection between SFHWBE and the integer factorization problem, where it is noted that no efficient (polynomial time) integer factorization algorithm has yet been found.

If a PPT algorithm $\mathcal{F}$ can factor N=pq or k=s(p−1) then there exists a PPT algorithm $\mathcal{G}$ that can invert Enc (P, m). The proof is obvious, since the SFHWBE private key p is a prime factor of N and also (p−1) is a factor of k.

Figure 8:
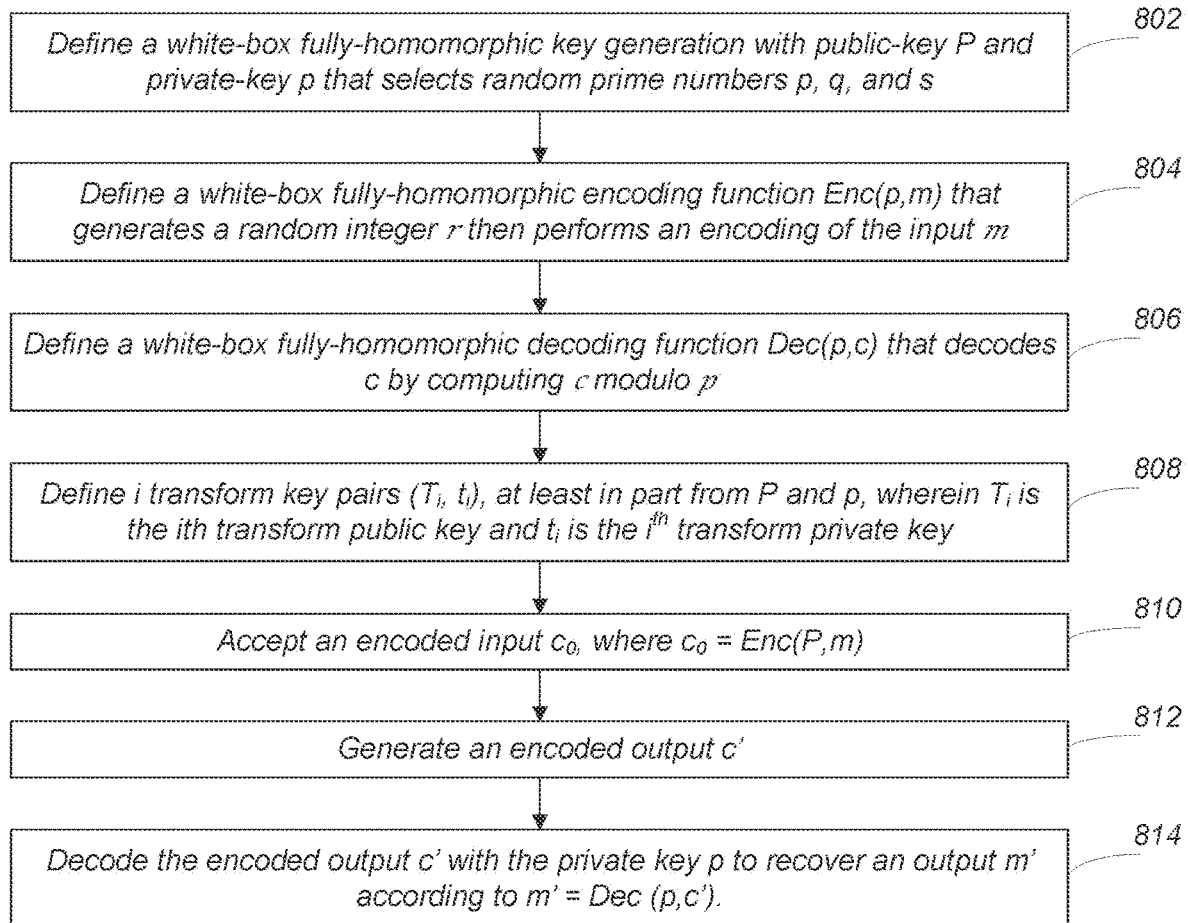
FIG. 8 is a diagram illustrating exemplary method steps that can be used to practice one embodiment of the invention to compute an algorithm $\mathcal{A}$ (m, S) having i operations with input m and secret S.

FIG. 8 is a diagram illustrating exemplary method steps that can be used to practice one embodiment of the invention to compute an algorithm $\mathcal{A}$ (m, S) having i operations with input m and secret S. In block 802 a white-box fully-homomorphic key generation function $(P, p) \rightarrow \text{Gen}(1^w)$ is defined with public-key P and private key p that selects random prime numbers p, q, $s \in W$ of similar size. In this case:

$B = \{0, 1\}^b$ is the domain of order b, of the algorithm $\mathcal{A}$, where $b \geq 8$;

$W = \{0, 1\}^w$ is a white-box domain of order w, for $w \gg b$;

$p > 2^b$ is a white-box fully-homomorphic private key;

N=pq;

k=s(p−1);

P=(N, k) is a white-box fully-homomorphic public key.

In block 804, a white-box fully homomorphic encoding function $\text{Enc}(P, m) := m^{rk+1} \pmod N$ that generates a random integer $r \in W$, then performs an encoding of the input $m \in B$ is defined. In block 806, a white-box fully-homomorphic decoding function $\text{Dec}(p, c) := c \pmod p$ that decodes c by computing c modulo p is defined. In block 808, i transform key pairs $(T_i, t_i)$ are defined at least on part from P and p, wherein $T_i$ is the $i^{th}$ transform public key and $t_i$ is the $i^{th}$ transform private key. This comprises selecting prime numbers $t_i$ and $q_i \in W$ of similar size to p, with $t_i > 2^b$, computing $N_i = p_i p^{-1} q_2$ such that $N_i$ and N are pairwise co-prime, and computing $e_i = p_i p^{-1} - 1$ where $T_i = (N_i, e_i)$. In block 810, an encoded input $c_0$, where $c_0 = \text{Enc}(P, m)$ is accepted. In block 812, an encoded output c' is generated by performing, for each of the i operations: accepting an encoded transform public key $T_i = \text{Enc}(T_i, S)$, performing the $i^{th}$ operation on the encoded input $c_{i-1}$ and the encoded transform public key in modulo $N_i$ to obtain an encoded output $c_i$, and reencoding $c_i$ with transform $T_i$ without any interim decoding operation. In block 814, the encoded output c' is decoded with the private key p to recover an output m' according to $m' = \text{Dec}(p, c')$, such that $m' = \mathcal{A}(m, S)$.

In one embodiment, the algorithm $\mathcal{A}$ is a decryption algorithm including at one of a Rivest-Shamir-Aldeman (RSA) algorithm, an elliptic curve cryptography (ECC) algorithm, an advanced encryption standard (AES) algorithm, and a triple data standard (IDES) algorithm.

In another embodiment, the algorithm $\mathcal{A}$ includes an RSA decryption algorithm RSADecrypt, and the accepted encoded input is $c_0 = \text{Enc}(P, M)$, wherein M=RSAEncrypt (RSAPLK, m) is an RSA encrypted version of the input message m encoded with the white-box fully-homomorphic public key P, where (RSAPVK, RSAPLK) is a RSA private/public keypair corresponding to the RSADecrypt and RSAEncrypt algorithms. Further, the accepted encoded transform public key is $T_i$=Enc($T_i$, RSAPVK), wherein RSAPVK is the RSA private key encoded with the white-box fully-homomorphic public key P, and the one or more operations comprise RSADecrypt implementation, with encoded input $c_{i-1}$ and the encoded transform public key $T_i$=Enc($T_i$, RSAPVK) used to compute each encoded output $c_i$. Also in this embodiment, decoding the encoded output c' with the private key p to recovers the output message m' according to m'=Dec(p, c').

SFHWB Test Results

Basic Algebra Benchmarks

A prototype SFHWB was written in C++ consisting of 10,000 iterated additions and multiplications and compared it to baseline algebra. The baseline was computed using built-in 64 bit integral types. A ESCP VLI library was used for the SFHWB large integer operations. All benchmarks were run on Intel Core i5-4670 64 bit 3.4 GHz, 16 GB RAM. The results are presented in Table 1 below.

TABLE 1

SFHWB algebra benchmark comparisons.

| b | Baseline algebra | w | SFHWB algebra | Delta |
|---|---|---|---|---|
| 64 | 394 μs/iteration | 128 | 457 μs/iteration | 1.16 |
| 64 | 355 μs/iteration | 256 | 517 μs/iteration | 1.46 |
| 64 | 402 μs/iteration | 512 | 645 μs/iteration | 1.60 |
| 64 | 413 μs/iteration | 1024 | 815 μs/iteration | 1.97 |

SFHWB RSA Decrypt Benchmarks

A Prototype SFHWB was written in C++ and compared with baseline RSA decryption. The results are presented in Table 2 below.

TABLE 2

SFHWB RSA decrypt benchmark comparisons.

| b | Baseline RSA decrypt | w | SFHWB RSA decrypt | Delta |
|---|---|---|---|---|
| 512 | 109 ms/iteration | 768 | 291 ms/iteration | 2.7 |
| 1024 | 649 ms/iteration | 1536 | 2.0 s/iteration | 3.1 |
| 2048 | 4.6 s/iteration | 3072 | 15 s/iteration | 3.3 | further performance improvements as the SFHWB implementation is optimized are expected.

Footprint Comparisons

Table 3 presents results showing significant memory footprint reductions in the when compared to 8 bit white-box operations implemented with traditional lookup tables.

TABLE 3

SFHWB footprint comparisons between a baseline ESCP white-box implementation and SFHWB. Both implementations were compiled with gcc 5.3.1 and the '—O3' flag.

| b | Baseline footprint | w | SFHWB footprint | Delta |
|---|---|---|---|---|
| 8 | 264 KB | 128 | 2.3 KB | 0.009 |
| 8 | 264 KB | 256 | 2.5 KB | 0.009 |
| 8 | 264 KB | 512 | 3.1 KB | 0.012 |
| 8 | 264 KB | 1024 | 4.1 KB | 0.016 |

Hardware Environment

Figure 9:
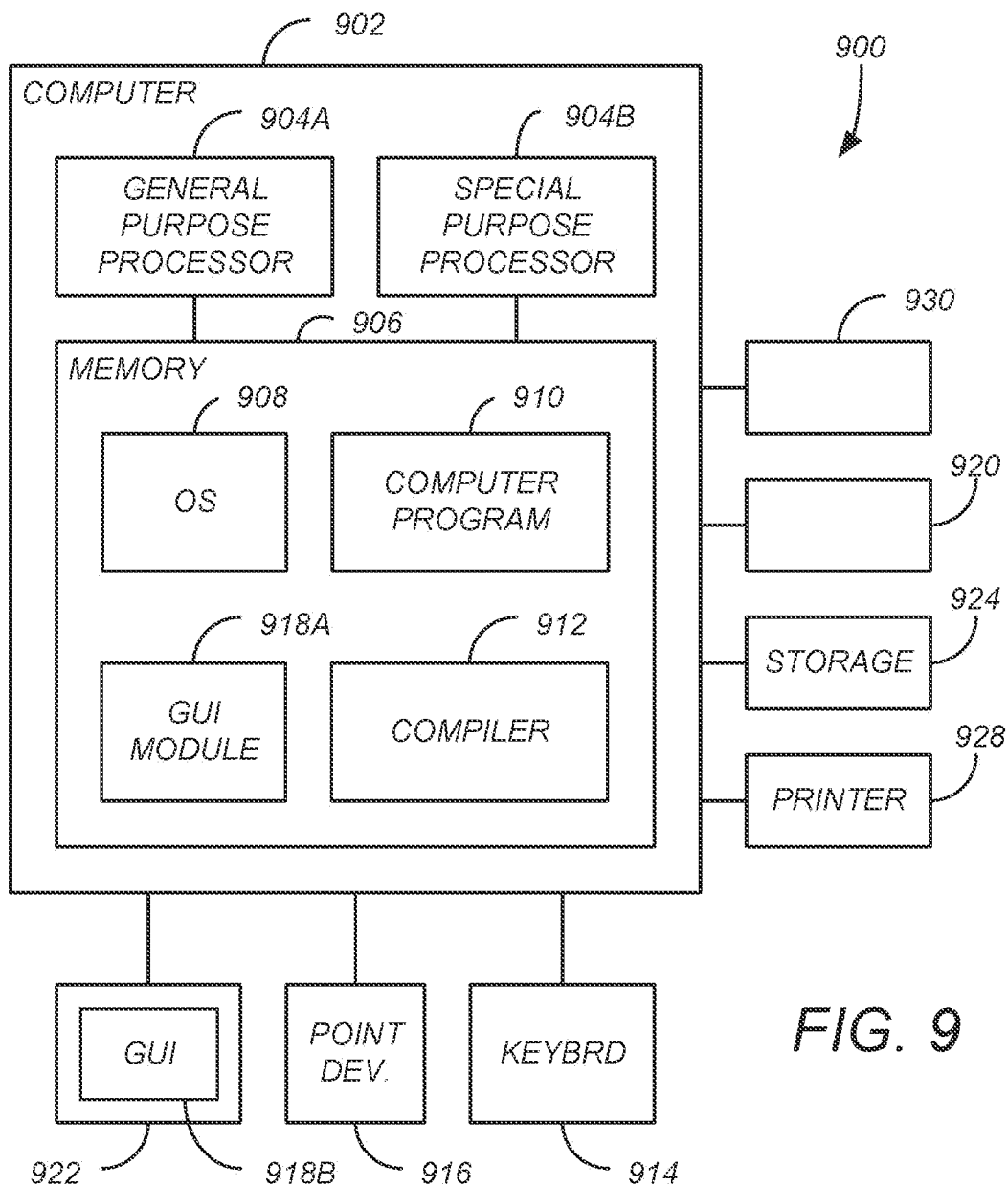
FIG. 9 is a diagram illustrating an exemplary computer system that could be used to implement elements of the present invention.

FIG. 9 is a diagram illustrating an exemplary computer system 900 that could be used to implement elements of the present invention, including the transmitter 202, receiver 204, processor 206, encoder 404, 404' and decryptor 406. The computer 902 comprises a general-purpose hardware processor 904A and/or a special purpose hardware processor 904B (hereinafter alternatively collectively referred to as processor 904) and a memory 906, such as random-access memory (RAM). The computer 902 may be coupled to other devices, including input/output (I/O) devices such as a keyboard 914, a mouse device 916 and a printer 928.

In one embodiment, the computer 902 operates by the general-purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, or a flash drive. Further, the operating system 908 and the computer program 910 are comprised of computer program instructions which, when accessed, read and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of computing an algorithm A(m, S) having i operations with input m and secret S, the method comprising:
    defining a white-box fully-homomorphic key generation function with a public key P and a private key p;
    defining a white-box fully-homomorphic encoding function Enc(P, m)=$m^{rk+1}$(mod N) that generates a random integer r∈W, then performs an encoding of the input m∈B;
    defining a white-box fully-homomorphic decoding function Dec(p, c):=c(mod p) that decodes c by computing c modulo p;
    defining i transform key pairs ($T_i$, $t_i$), at least on part from P and p, wherein $T_i$ is the $i^{th}$ transform public key and $t_i$ is the $i^{th}$ transform private key;
    accepting an encoded input $c_0$, where $c_0$=Enc(P, m); and
    generating an encoded output c' by performing, for each of the i operations, the steps of:
        accepting an encoded transform public key $T_i$=Enc($T_i$, S);
        performing the $i^{th}$ operation on the encoded input $c_{i-1}$ and the encoded transform public key in modulo $N_i$ to obtain an encoded output $c_i$; and
    reencoding $c_i$ with transform $T_i$ without any interim decoding operation; decoding the encoded output c' with the private key p to recover an output m' according to m'=Dec(p, c'), such that m'=A(m, S).

2. The method of claim 1 the step of defining i transform key pairs comprises:
    selecting prime numbers $t_i$, and $q_i$∈W of similar size to p, with $t_i$>$2^b$;
    computing $N_i$=pip$^{-1}q_2$ such that $N_i$ and N are pairwise co-prime; and
    computing $e_i$=pip$^{-1}$-1 where $T_i$=($N_i$, $e_i$).

3. The method of claim 1, wherein the algorithm A is a decryption algorithm including at least one of a Rivest-Shamir-Aldeman (RSA) algorithm, an elliptic curve cryptography (ECC) algorithm, an advanced encryption standard (AES) algorithm, and a triple data standard (TDES) algorithm.

4. The method of claim 3, wherein:
    the algorithm A includes an RSA decryption algorithm RSADecrypt;
    the accepted encoded input is c=Enc(P, M), wherein M=RSAEncrypt(RSAPLK, m) is an RSA encrypted version of the input message m encoded with the white-box fully-homomorphic public key P, where (RSAPVK, RSAPLK) is a RSA private/public keypair corresponding to the RSADecrypt and RSAEncrypt algorithms;
    the accepted encoded transform public key is $T_i$=Enc($T_i$, RSAPVK), wherein RSAPVK is the RSA private key encoded with the white-box fully-homomorphic public key P;
    the one or more operations comprise an RSADecrypt implementation, with encoded input $c_{i-1}$ and the encoded transform public key $T_i$=Enc($T_i$, RSAPVK) used to compute each encoded output $c_i$; and
    decoding the encoded output c' with the private key p to recovers the output message m' according to m'=Dec(p, c').

5. The method of claim 1, further comprising:
    securely encoding the input message m according to $c_0$=Enc(P, m); and securely encoding the transform public key according to $T_i=\text{Enc}(T_i, S)$.

6. A method of computing a decryption algorithm $\mathcal{A}$ (m, S) having i operations with input m and secret S, wherein the algorithm $\mathcal{A}$ includes an RSA decryption algorithm RSA-Decrypt, the method comprising:

accepting encoded input $c_0=\text{Enc}(P, M)$, wherein M=RSAEncrypt(RSAPLK, m) is an RSA encrypted version of the input message m encoded with the white-box fully-homomorphic public key P, where (RSAPVK, RSAPLK) is an RSA private/public keypair corresponding to the RSADecrypt and RSAEncrypt algorithms; and obtaining an encoded output $c_i$ by performing an operation on the encoded input $c_0$ and an accepted encoded transform public key $T_i=\text{Enc}(T_i, \text{RSAPVK})$ in modulo $N_i$, and wherein RSAPVK is the RSA private key encoded with the white-box fully-homomorphic public key P.

7. The method of claim 6, including the steps of:

performing one or more operations including an RSADecrypt implementation, with encoded input $c_{i-1}$ and the encoded transform public key $T_i=\text{Enc}(T_i, \text{RSAPVK})$ used to compute each encoded output $c_i$; and decoding the encoded output with a private key to recover an output message m' according to m'=Dec(p, c').

8. The method of claim 6, further comprising the steps of:

securely encoding the input message m according to $c_0=\text{Enc}(P, m)$; and securely encoding the transform public key according to $T_i=\text{Enc}(T_i, S)$.

\* \* \* \* \*